(No Model.)
S. E. COOK.
SUSPENDER BUCKLE.
No. 475,386.  Patented May 24, 1892.
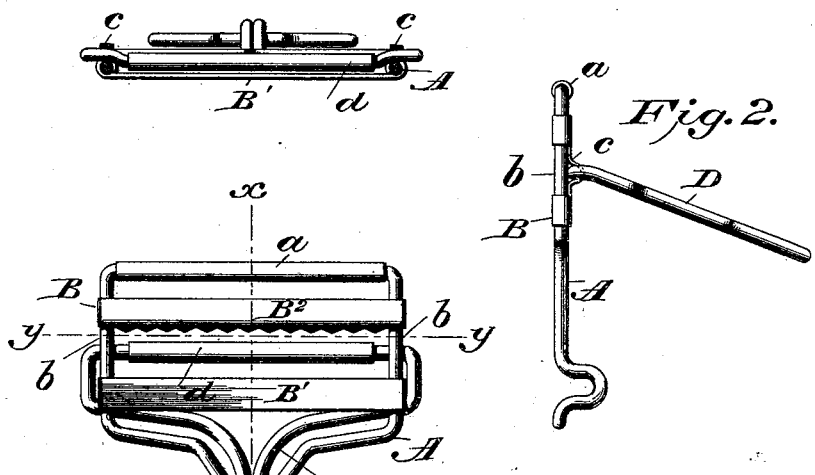
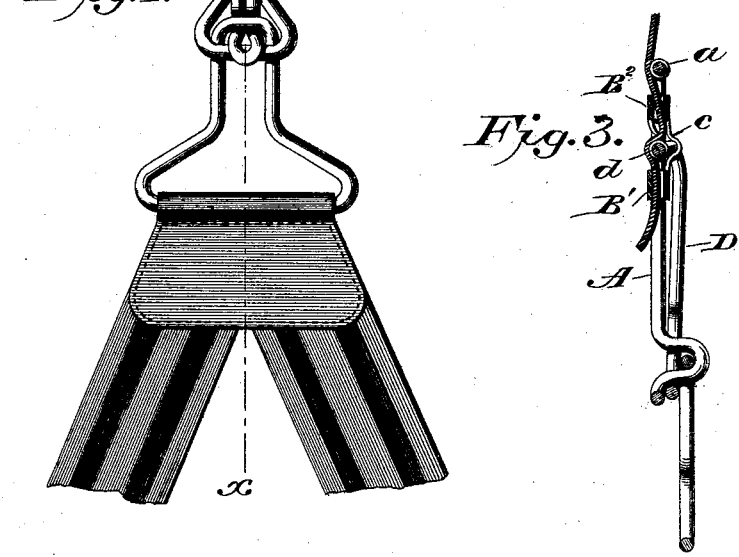
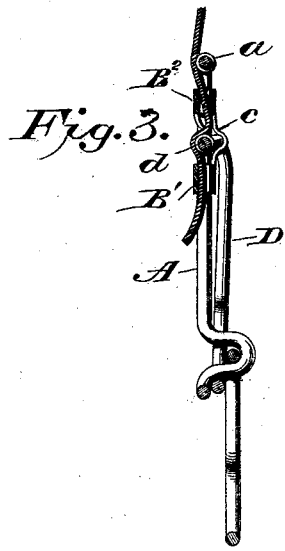
Sheldon E. Cook.
Inventor
Witnesses

UNITED STATES PATENT OFFICE.

SHELDON E. COOK, OF CHICAGO, ILLINOIS.

SUSPENDER-BUCKLE.

SPECIFICATION forming part of Letters Patent No. 475,386, dated May 24, 1892.

Application filed November 12, 1891. Serial No. 411,733. (No model.)

*To all whom it may concern:*

Be it known that I, SHELDON E. COOK, a subject of the Queen of Great Britain, residing at Chicago, in the county of Cook and State of Illinois, have invented certain new and useful Improvements in Suspender-Buckles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in suspender-buckles; and it consists in the construction and combination of the parts, as will be hereinafter fully set forth, and particularly pointed out in the claims.

In the accompanying drawings, forming part of this specification, Figure 1 is a front view of a buckle constructed in accordance with my invention. Fig. 2 is a side elevation. Fig. 3 is a sectional view taken on the line $xx$ of Fig. 1. Fig. 4 is a transverse sectional view taken on the line $yy$ of Fig. 1.

The main frame A of the buckle is preferably made of wire in substantially the usual form, the upper portion thereof, where the meeting ends of the bar composing the frame are located, being inclosed by a roller or sheath $a$, the lower end of the frame being formed into a hook, as shown. The parallel side pieces $bb$ of the frame have rigidly connected thereto a plate B, which has a central longitudinal opening, the ends of said plate encircling the side pieces and the connecting portions $cc$ given a short bend to provide bearings for the swinging frame D. The lower member B' of the plate B is plain, while the upper member $B^2$ is serrated on its lower edge to form teeth, which are bent inward to engage with the suspender-strap, as fully appears in Fig. 3 of the drawings. The frame D has a loop formed at its lower end, and the upper cross-bar $d$ thereof is bent adjacent to its bearings $cc$ on the main frame, so as to position said bar between the members B' and $B^2$ of the plate B and on a line therewith when the loop is in engagement with the hook portion at the base of the main frame, and said bar may be inclosed by a roller or sheath, as shown.

It will be noted that a buckle constructed as described is made of substantially three parts—to wit, the main frame, the rocking frame D, and the plate B, carried by the main frame—and the plate B not only provides bearings for pivotally connecting the swinging frame thereto, but also reinforces the main frame and prevents the same sagging. When it is desired to secure a suspender-strap to the buckle, it is first passed between the upper cross-bar $a$ and member $B^2$ of the plate B, and from there down in front of the cross-bar $d$ of the swinging frame, and then beneath the member B'. When the swinging frame is turned down, as shown in Fig. 3, the cross-bar $d$ will force the strap in engagement with the teeth and make a sure and positive engagement between the buckle and strap.

Having thus described my invention, what I claim as new, and desire to secure by Letters Patent, is—

1. In a buckle for the purpose set forth, the combination of a frame A, having parallel side pieces, a plate B, consisting of a member $B^2$, having inwardly-projecting teeth formed on its lower edge, and a member B', the edges of which are plain, said members being connected to each other by end straps $cc$, which are bent to form bearings for a pivoted frame, and a pivoted frame D, having a cross-bar $d$ bent out of line or to one side of the portions which lie in the bearings, the lower ends of the frames being adapted to engage with each other, substantially as set forth.

2. In a buckle, the combination of a frame A, having cross-bars $B^2$ and B' attached to the side pieces thereof, the upper cross-bar having teeth on its lower edge, a swinging frame pivotally secured to the parallel side pieces of the frame A between the cross-bars $B^2$ and B', the swinging frame having a depending portion, and means for holding the frames in engagement with each other, substantially as shown, and for the purpose set forth.

3. In a buckle for the purpose set forth, the combination of a frame A, having parallel side pieces, a plate B, having its end members bent to embrace the side pieces, and a pivoted frame secured to the frame A between the bars $B^2$ and B' by straps or connecting portions $c$, the frames A and D being adapted to be held in engagement with each other at their lower ends, substantially as shown, and for the purpose set forth.

4. In a buckle, the combination of a wire frame having parallel side pieces, a cross-bar at its upper end, and converging lower ends which unite to form a hook, a plate B, having a central opening or space between the upper and lower edges of said plate, and inwardly-projecting teeth formed on the lower edge of the upper portion of said plate, the ends of said plate being bent to embrace the parallel side bars of the frame A and secure thereto a swinging frame having a depending portion looped for engagement with the hook on the frame A, said frame being pivotally attached to the center portion of the parallel side bars, so that the cross-bar thereof will be located between the upper and lower edges of the opening in the plate B, substantially as shown, and for the purpose set forth.

In testimony whereof I affix my signature in presence of two witnesses.

SHELDON E. COOK.

Witnesses:
 W. C. CROOKS,
 L. J. RUSH.